Patented May 9, 1933

1,908,523

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

MANUFACTURE OF CELLULOSE ACETATE

No Drawing. Application filed February 1, 1929. Serial No. 336,922.

This invention relates to cellulose acetate and particularly to a process of preparing this product economically.

Cellulose acetate is prepared by treating suitable cellulose material such as cotton linters with acetic acid in the presence of a catalyst, or, in some instances, without a catalyst at somewhat higher temperatures, as an initial pretreatment; a proportion of acetic anhydride is added and acetylation is continued until the cellulose has been converted into cellulose triacetate. In this operation a portion of the acetic anhydride is converted into acetic acid because of the presence of water in the initial reaction mixture and a considerable loss results from the necessity of employing such an excess of the relatively expensive acetic anhydride.

It is the object of the present invention to provide a more economical process for the preparation of cellulose acetate and particularly to avoid the loss of acetic anhydride in the operation.

I have discovered that a considerable saving can be effected by conducting the acetylation in two steps as in the ordinary procedure, with an intermediate treatment of the reaction mixture to remove water therefrom. The removal of the water may be accomplished readily by adding to the mixture a suitable liquid such as ethylene chloride, benzene, ethyl acetate, or the like, and subjecting the mixture to an azeotropic distillation. Alternatively, the liquid added to the reaction mixture may be replaced by a liquid reagent which is employed in the pretreatment, as, for example, ethylene chloride which may be mixed with the acetic acid during the pretreatment, and distillation subsequently conducted by means of which water is removed from the pretreatment mixture.

In carrying out the invention, I may employ any of the usual pretreatment processes, for example those described in the United States patents to H. T. Clarke and C. J. Malm, No. 1,668,944 and No. 1,668,945, or in the patent to H. LeB. Gray and C. J. Staud, No. 1,683,347. In the procedures as described, I may add to the reaction mixture, following pretreatment, a suitable liquid such as ethylene chloride and then subject the mixture to an azeotropic distillation. The distillation and the apparatus employed therein are well understood in the art and no specific description thereof is necessary. When the water has been removed, either wholly or partially, acetic anhydride in proper proportions may be added to the mixture and the acetylation may be continued in accordance with the practice described in the patents mentioned or in accordance with other well known processes.

In order that the invention may be more readily understood, I shall describe specific examples thereof which, however, are merely illustrative of the best practice.

*Example 1.*—One hundred pounds of cotton containing 3% moisture are added to 700 pounds of acetic acid. The mixture is maintained at 115° C. for four hours to complete the pretreatment. Thereafter, I add 100 pounds of ethylene chloride to the mixture and subject it to an azeotropic distillation. The ethylene chloride distils from the mixture carrying with it the water which is present therein. When all of the ethylene chloride is separated, the mixture is cooled to 15° C. I thereupon add a mixture of 275 pounds of 85% acetic anhydride, 5 pounds of 95% phosphoric acid, and 2 pounds of sulphuric acid. After the acetic anhydride and catalyst have been thoroughly incorporated in the mixture, the temperature is slowly raised to 20° C. A uniform and very smooth reaction then takes place and the temperature of the reaction mixture rises slowly to about 40° C. The reaction is then complete. The mixture may be used as a "dope" for hydrolysis to acetone solubility or the cellulose acetate may be precipitated in accordance with the usual procedure.

*Example 2.*—One hundred pounds of cotton containing 3% moisture are added to a mixture of 700 pounds of ethylene chloride and 100 pounds of acetic acid. The mixture is kept at 65° C. for three hours to complete the pretreatment. Thereupon, the temperature is raised to the boiling point of the azeotropic mixture of ethylene chloride and water, the ethylene chloride and water are distilled and condensed until all of the water has been removed. About 100 pounds of ethylene chloride is required to carry off the water. The mixture is then cooled to 15° C. I then add 275 pounds of 85% acetic anhydride, 5 pounds of 95% phosphoric acid and 2 pounds of 95% sulphuric acid. The acetylation is continued at a temperature which rises gradually from 15° C. to 40° C. At the latter temperature acetylation is complete. The reaction mixture may be employed as a "dope" for hydrolysis to acetone solubility or the cellulose acetate may be precipitated therefrom in accordance with the usual procedure.

The process as described is simple and effective and may be conducted without incurring any substantial additional expense. It results in a saving of approximately 10% of the acetic anhydride which would be required otherwise to complete the reaction. This saving affords an important advantage.

The process as described is applicable generally to the production of cellulose acetate by any of the usual processes employed heretofore and depends upon the separation of water from the reaction mixture before acetic anhydride is added thereto to complete the acetylation. Various changes may be made in the procedure therefor, and particularly in the character of the solvents, catalysts, and acetylating agents, without departing from the invention or sacrificing any of its advantages.

Having thus described my invention, what I claim as new and desire to secure by Letters Patent is:

1. A process of preparing cellulose acetate by esterification which comprises subjecting cellulose containing hydroscopic water to pretreatment, then distilling the mixture in the presence of a liquid, which forms an azeotropic mixture with water, to remove the water therefrom and thereafter esterifying the cellulose material.

2. A process of preparing cellulose acetate by esterification which comprises subjecting cellulose containing hydroscopic water to pretreatment with acetic acid, then distilling the mixture in the presence of a liquid, which forms an azeotropic mixture with water, to remove the water therefrom and thereafter esterifying the cellulose material.

3. The process of preparing cellulose acetate which comprises pretreating cellulose containing hydroscopic water in the presence of a liquid which forms an azeotropic mixture with water, then distilling the mixture to remove the water therefrom, and thereafter esterifying of the cellulose.

4. The process of preparing cellulose acetate which comprises pretreating cellulose containing hydroscopic water in the presence of ethylene chloride, then distilling the mixture to remove the water therefrom, and thereafter esterifying the cellulose.

Signed at Rochester, New York, this 22nd day of January, 1929.

CARL J. MALM.